(12) United States Patent
Vossen et al.

(10) Patent No.: US 9,053,151 B2
(45) Date of Patent: Jun. 9, 2015

(54) DYNAMICALLY JOINED FAST SEARCH VIEWS FOR BUSINESS OBJECTS

(75) Inventors: Oliver Vossen, Walldorf (DE); Martin Müller, Walldorf (DE); Maic Wintel, Walldorf (DE)

(73) Assignee: SAP SE, Walldorf (DE)

(*) Notice: Subject to any disclaimer, the term of this patent is extended or adjusted under 35 U.S.C. 154(b) by 173 days.

(21) Appl. No.: 12/847,295

(22) Filed: Jul. 30, 2010

(65) Prior Publication Data
US 2012/0030189 A1   Feb. 2, 2012

(51) Int. Cl.
G06F 7/00 (2006.01)
G06F 17/30 (2006.01)

(52) U.S. Cl.
CPC .... G06F 17/30498 (2013.01); G06F 17/30501 (2013.01); G06F 17/30418 (2013.01)

(58) Field of Classification Search
USPC .......................................... 707/787, 687, 705
See application file for complete search history.

(56) References Cited

U.S. PATENT DOCUMENTS

| | | | |
|---|---|---|---|
| 6,505,188 B1 * | 1/2003 | Ghazal et al. ................. | 707/714 |
| 6,996,558 B2 * | 2/2006 | Dettinger et al. ..................... | 1/1 |
| 7,181,731 B2 * | 2/2007 | Pace et al. ..................... | 717/136 |
| 7,660,814 B2 * | 2/2010 | Lee et al. ................ | 707/999.102 |
| 8,191,001 B2 * | 5/2012 | Van Wie et al. ................ | 715/757 |
| 2003/0028540 A1 * | 2/2003 | Lindberg et al. ............... | 707/100 |
| 2004/0230584 A1 * | 11/2004 | Nouri ............................. | 707/100 |
| 2005/0050030 A1 * | 3/2005 | Gudbjartsson et al. ........... | 707/3 |
| 2006/0136470 A1 * | 6/2006 | Dettinger et al. ............. | 707/102 |
| 2007/0038610 A1 * | 2/2007 | Omoigui ........................... | 707/3 |
| 2008/0140620 A1 * | 6/2008 | Bender ............................. | 707/3 |
| 2009/0037489 A1 * | 2/2009 | Grundler et al. .............. | 707/201 |
| 2009/0254843 A1 * | 10/2009 | Van Wie et al. ................ | 715/757 |
| 2010/0010980 A1 * | 1/2010 | Dettinger et al. .................. | 707/4 |
| 2010/0070448 A1 * | 3/2010 | Omoigui ......................... | 706/47 |
| 2011/0004612 A1 * | 1/2011 | Boyersmith et al. .......... | 707/769 |
| 2011/0246518 A1 * | 10/2011 | Mehrotra et al. ............. | 707/770 |

* cited by examiner

Primary Examiner — Hosain Alam
Assistant Examiner — Eliyah S Harper
(74) Attorney, Agent, or Firm — Buckley, Maschoff & Talwalkar LLC

(57) ABSTRACT

According to some embodiments, an anchor transactional view may be defined for at least one business object data structure. The anchor transactional may have a plurality of anchor fields, each anchor field representing a data source and being associated with a field of an anchor search view. An indication of at least one extension field to the anchor search view may be received. The anchor search view and at least one extension field may represent, for example, a virtual fast search infrastructure view. Responsive to the received indication of the at least one extension field, an additional view may be dynamically joined at runtime to the anchor transactional view. The additional view may have at least one additional field, and each additional field may be associated with one of the extension fields.

21 Claims, 6 Drawing Sheets

US 9,053,151 B2

DYNAMICALLY JOINED FAST SEARCH VIEWS FOR BUSINESS OBJECTS

FIELD

Some embodiments relate to a service-oriented architecture associated with business objects. More specifically, some embodiments provide a framework allowing for dynamically joined fast search views in connection with business objects.

BACKGROUND

As business oriented computing systems, applications, and platforms increase in complexity, the amount of data being processed, including data processed by enterprise platforms, may also increase in breadth and complexity. While the accurate modeling of business transactions, interactions, and relationships between different business entities may be a global goal on an enterprise-level, various business entities within an industry or organization may be more interested in specific data sources of a modeled business that is of particular relevance to their operations. As such, some of the business objects and associated nodes of those business objects may not be pertinent to a particular user, application, process, or service.

One way of accessing information in a business object is to execute a search that contains various conditions and returns a set of result data (e.g., a set of fields containing information from the business object). A provider of an enterprise computing environment might create a set of standard pre-defined searches (or views associated with searches) that are likely to be of interest to many clients. In many cases, however, an enterprise or client may want to customize these standard business objects searches and/or create entirely new searches. For example, a client might want to implement business logic and/or include results from additional data stores when performing a search. Moreover, it may be important that the creation and execution of a business object searches be performed in a simple, efficient, and secure manner.

Accordingly, a method and mechanism for efficiently defining and executing views and/or searches in connection with a BO model (e.g., including fields associated with flexible sets of fields, views, and/or searches) may be provided by some embodiments herein.

DETAILED DESCRIPTION

A provider of the business process platform may create a number of standard "business object" searches that are likely to be of interest to various enterprises. For example, the provider might create business object searches associated with customer relationship management processes, supply chain information, human resources records, and/or financial data. As used herein, the phrase "business object" may refer to a set of entities with common characteristics and common behavior representing a defined business semantic. Note that business data may be stored within physical tables of a database. The database may comprise a relational database such as SAP MaxDB, Oracle, Microsoft SQL Server, IBM DB2, Teradata and the like. Alternatively, the database could be a multi-dimensional database, an eXtendable Markup Language (XML) document, or any other structured data storage system. The physical tables may be distributed among several relational databases, dimensional databases, and/or other data sources.

The structures of and relationships between the physical database tables may be complex. Business objects may be used to shield developers and end-users from these complexities. A business object may comprise, for example, a software model including nodes to encapsulate related data and methods.

A business object may be associated with a business entity, such as a customer, partner, sales order, product, store, time, etc., represented in the data of a data source. Each instance of a business object may represent a particular instance of the entity represented by the business object. An instance of a sales order business object may, for example, provide a mapping to the underlying tables storing data associated with a particular sales order.

Figure 1:
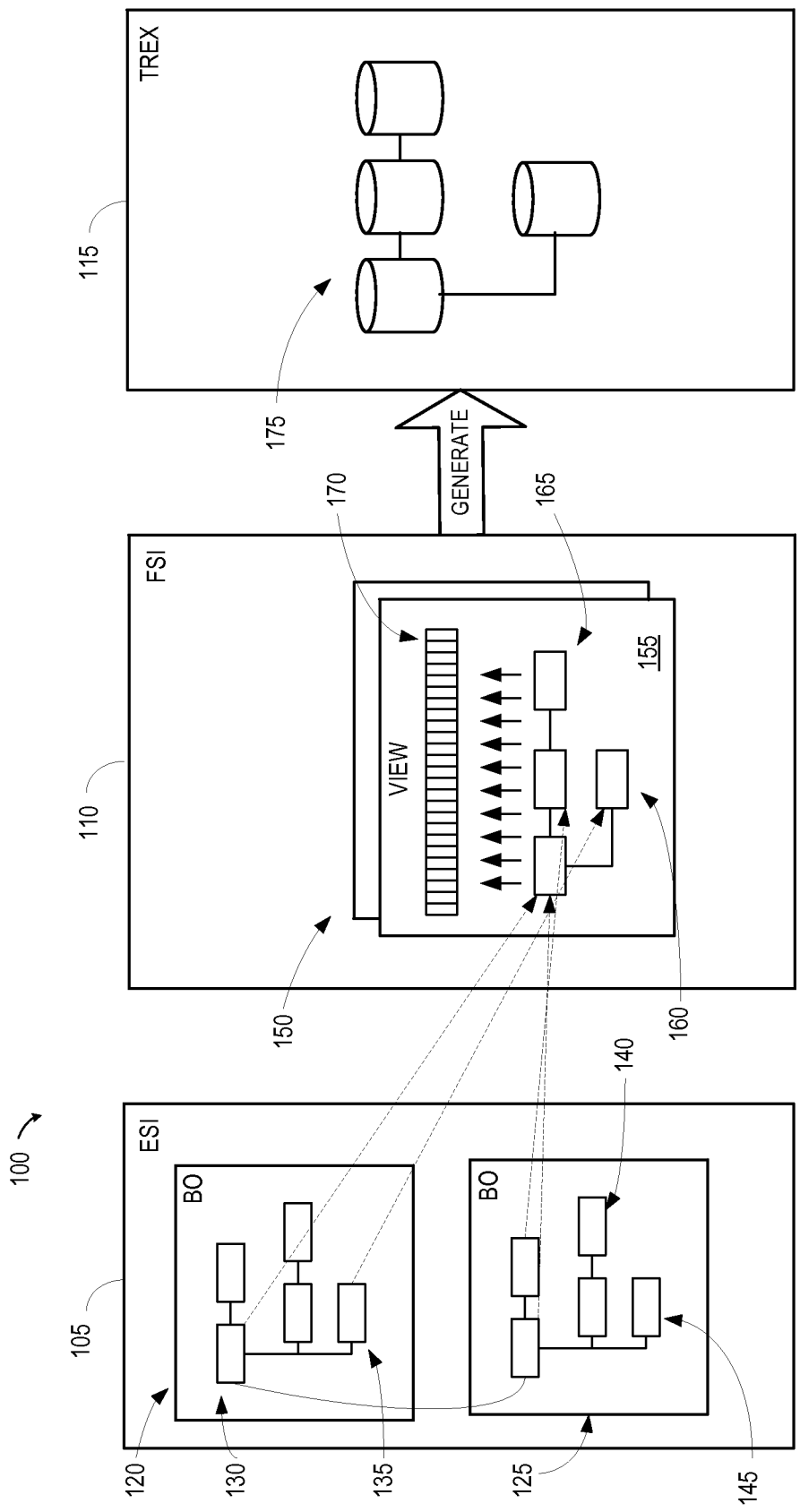
FIG. 1 is a block diagram of a system.

A client might access a business process platform to view business object information in various ways. For example, he or she might execute a search asking to view the ten most recent product shipments from a particular factory. FIG. 1 is an illustrative block diagram of an enterprise computing environment 100 suitable for supporting, implementing, and/or providing such services related to a business object modeled database. In general terms, the business object model defines business-related concepts for a number of business transactions. The business object model may reflect the decisions and relationships about real world businesses acting in business transactions and may span across different industries and business areas. The business object model may be, for example, defined by business objects and their relationships to each other. Despite being applicable across different business entities and industries, business object model interfaces may be consistent across the different industries and across different business units because they are generated using a single business object model.

System 100 includes an Enterprise Service Infrastructure (ESI) 105 and a Fast Search Infrastructure (FSI) 110. In some embodiments, ESI 105 and FSI 110 may form or be a part of an application server. FSI 110 may interface with a search engine 115 such as, for example, the TREX search engine depicted in FIG. 1 which is provided by SAP AG. Business Objects (BOs), such a business objects 120 and 125, including their nodes (e.g., 130, 135, 140, 145) and services (e.g., query services, not shown) may be modeled and may include any suitable data structure. The BOs may be defined within ESI 105, wherein the definition for each BO may include BO nodes (e.g., 130, 135) and various services belonging to the nodes.

In some embodiments, a model-based extension of the BO model may extend across multiple BOs and means for defining a "view" meta entity may be provided. The view meta entity (also referred to as "view" herein) may be defined as a set of attributes that are linked to corresponding BO attributes of different BO 10 nodes and are connected to each other by database joins. Note that in some cases, a view may be associated with a single BO. The terms "join" and "joins" used herein may refer to, and are consistent with, the use of those terms as used and understood in the field of database management systems.

Still referring to FIG. 1, BOs 120 and 125 may be pre-defined data 15 structures, each including a number of business object nodes such as nodes 130 and 135 associated with BO 120 and nodes 140 and 145 associated with BO 125. For purposes of clarity, all of the nodes of the representative BOs 120 and 125 are not individually labeled with reference numbers. However, it is clear from FIG. 1 that each BO may have a plurality of node associated therewith. 20 Additionally, the relationships of the nodes of the BOs are depicted in FIG. 1 (e.g., parent-child relationships, siblings).

In some embodiments, the joins of a view may be inner joins and/or left outer joins, thereby representing a certain view onto the BO model and the attributes of the view may represent the registry of the underlying BO attributes. The underlying BO attributes may be used, for example, to selectively index or replicate BO data. In operation at runtime, a view may be used, for example in connection with a search engine, to execute query calls against generated indices based on the join conditions specified and defined with a view. Since the corresponding indices are structured according to the defined BO model structures, the execution of the query (or other service) may be done without any structural or data transformations.

A number of views 150 may be created and defined within the FSI 110. The creation of the views may be accomplished by using joins over different nodes. As illustrated in the example of FIG.1, two nodes from BO 120 and two nodes from BO 125 are used to construct and define a view 155 in FSI 110. The "lines" linking the nodes selected and included in the view are graphical representations of a database join (e.g., inner joins or left outer joins). Thus, it is seen that the data structure of a view may contain a select number of attributes of different BOs, as determined and represented by the selected and corresponding nodes included in the view. In this manner, a view may contain a set of attributes in a predefined manner across different nodes, including desired or select attributes of the corresponding nodes.

Note that the view may represent a logical view or collection of the underlying BO model. The view may encapsulate data modeling details, including but not restricted to, join relations between the multiple nodes associated with the view.

In some embodiments, the attributes of the joined nodes comprising the view, view fields 170 herein, are exposed to external processes and services. The actual data sources related to the nodes of the view may be hidden from external or outside processes such that view fields 170 of view 155 may be the only components of the view exposed and visible from the outside. In some embodiments, this aspect allows only desired or relevant attributes associated with a business modeled entity to be observed, as defined by the view.

Note that the view attributes could be persisted by replication in an index. A persistence of the view attributes may be generated and stored in indices of a data structure. The indices may be associated with an application, function, or service such as, for example, a search engine (e.g., TREX search engine 115) and/or another data structure such as a database shadow table (not shown). The indices of the search engine could correspond on a one-to-one (1:1) basis with the nodes of the view and might be redundant-free and specific.

Metadata of the FSI views 150 may be used as the basis for the data replication. The metadata of the views describes the data, that is the nodes, comprising the views that are to be replicated to data structures. The search engine or other applications, functions, and services may then use the indexed nodes in executing queries and/or other processes.

A provider of the enterprise computing environment 100 may create a set of standard pre-defined searches (or views associated with searches) that are likely to be of interest to many clients. In many cases, however, an enterprise or client may want to customize these standard business objects searches and/or create entirely new searches. For example, a client might want to implement business logic and/or include additional data stores when performing a search. Moreover, it may be important that the creation and execution of a business object searches be performed in a simple, efficient, and secure manner.

Figure 2:
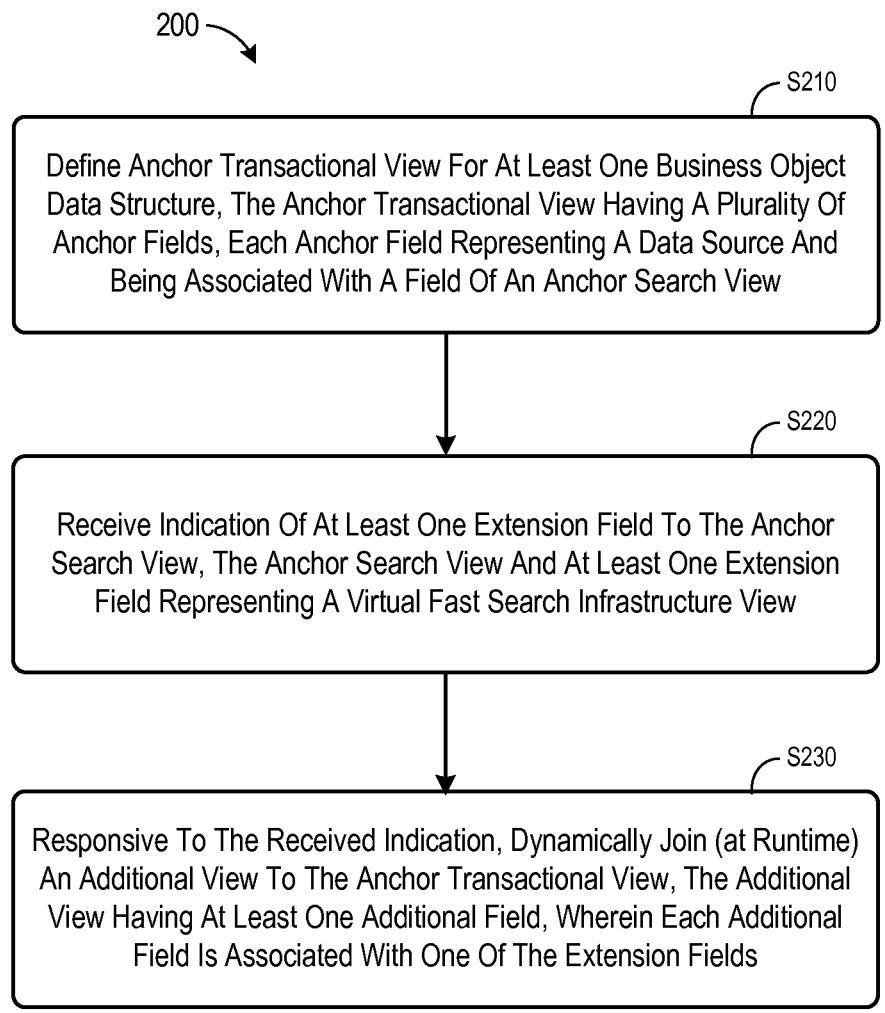
FIG. 2 is a flow diagram of a process according to some embodiments.

FIG. 2 is a flow diagram of process 200 according to some embodiments. The enterprise computing environment 100 may execute the process 200 as will be described below, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, an "anchor" transactional view for at least one business object data structure may be defined. The anchor transactional view may have a plurality of anchor fields, each anchor field representing a data source and being associated with a field of an anchor search view. The anchor transaction view might be created, for example, by the provider of the enterprise computing environment 100 and may be distributed to clients.

An indication of at least one extension field to the anchor search view may be received at S220, wherein the anchor search view and at least one extension field represent a "virtual" fast search infrastructure view. For example, a client might interact with a user interface to add additional data elements to an anchor search view.

Responsive to the received indication of the at least one extension field, in S230 an additional view is dynamically joined at runtime to the anchor transactional view. The additional view has at least one additional field, and each additional field is associated with one of the extension fields. The additional view that is dynamically joined at runtime might represent, for example, a master data view. Note that more than one master data view might be dynamically joined at runtime to the anchor transactional view. A list of views and respective join conditions may be passed to a view execution interface at runtime and a result might be provided to a client who added the extension fields (e.g., in connection with a report based at least in part on information in a result data structure).

Figure 3:
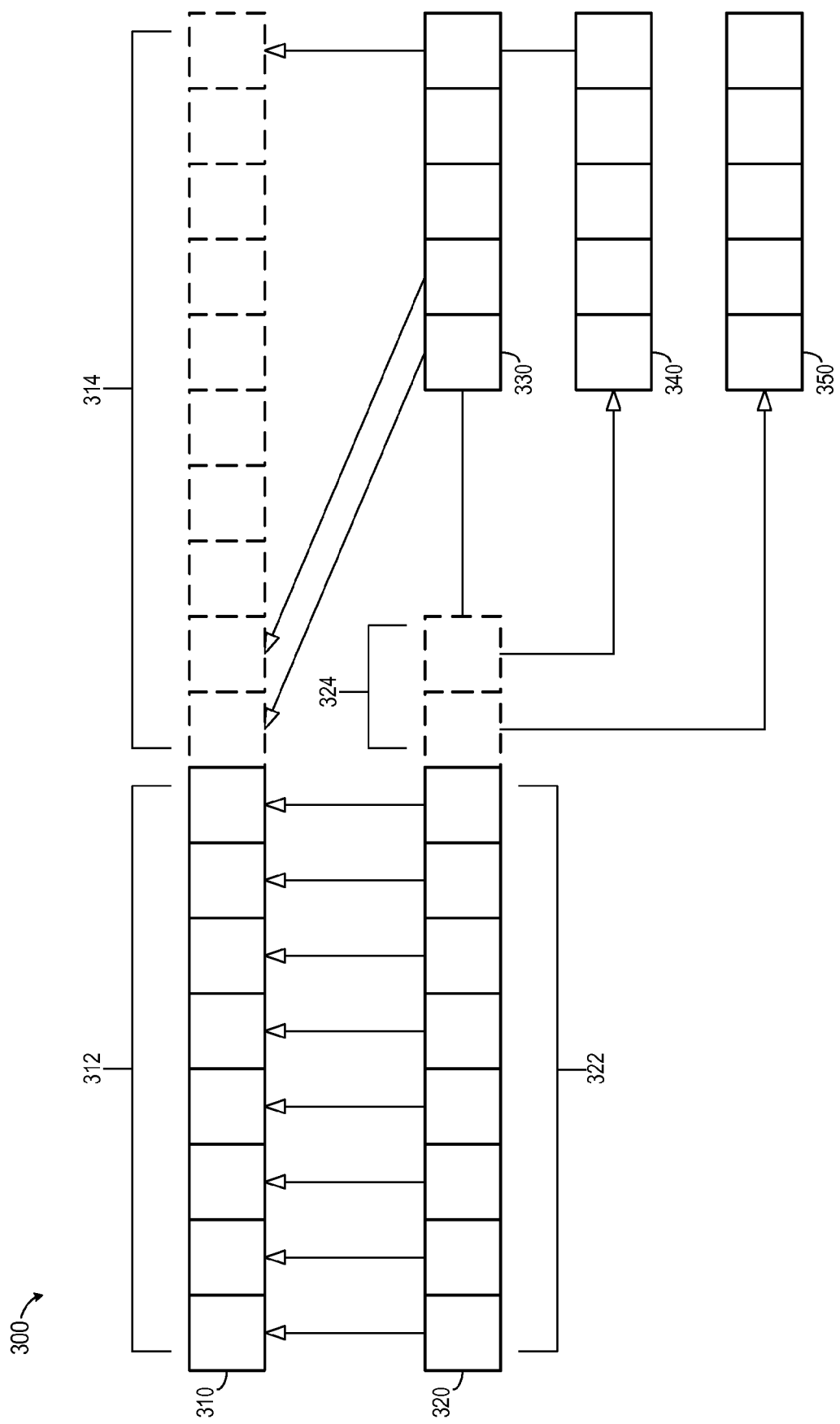
FIG. 3 illustrates dynamically joined fast search views in accordance with some embodiments.

FIG. 3 illustrates dynamically joined fast search views 300 in accordance with some embodiments. In this example, a virtual FSI view 310 includes an anchor search view portion 312 associated with transaction view 320 having an anchor transactional view portion 322. The anchor search view portion 312 and anchor transaction view portion 322 might, for example, be standard views defined by a business platform provider.

One or more extension fields 314 may be added to the anchor search view portion 312. For example, a client might indicate that additional information should be included in a report. As a result of the addition of these extension fields 314, additional views 330, 340, 350 may be joined to the transactional view 320 via an additional portion 324 as will now be described.

According to some embodiments, a provider of an enterprise business information service (e.g., the ByDesign service offered by SAP AG) may utilize a "fast search provider" to report data based on an FSI view (as described with respect to FIG. 1). This view may be modeled for each fast search provider. When these fast search providers are designed separately for master data and transactional data, reporting will typically be done only on fields that are in one (or the other) view type. For some types of delivered reports, this may not present a problem (e.g., when master data view attributes are not available for selection and aggregation). However, in some extensibility scenarios third-party developers or end users may want to extend fast search providers using fields that are only available in the master data. Note that pre-modeling all possible joins could lead to many substantially large views that cannot be efficiently handled using regular FSI and/or Advanced Business Application Programming (ABAP) tools.

Accordingly, some embodiments described herein utilize a dynamic approach to FSI view joins. At runtime, a list of views and the respective join conditions may be passed to a view execution interface. Using an efficient join path analysis algorithm, the join paths of all requested fields may then be calculated directly at run-time. The result may comprise, for example, the virtual fast search view 310 that exists only for the view execution. Note that the meta-data for this "virtual" view might not be persisted. Instead, an "in-memory" logical index may be created on the search engine. The selection and subsequent passing of data may then be completed using that logical index. In some embodiments, a caching mechanism helps ensure that multiple calls to the dynamically joined view do not result in multiple join path re-calculations.

As illustrated in FIG. 3, a transactional view 300 might include anchor fields 312, 322 associated with a standard report. Without third-party or client changes to that standard report, no other data is required. The additional of the extension fields 314, however, might require additional data sources, such as the additional views 330, 340, 350. The additional views 330, 340, 350 may comprise, for example, master data views that have fields relevant extensibility and/or flexibility. The additional master data views 330, 340, 350 may be joined to the anchor portion 322 view with a defined join condition. Note that FIG. 3 only illustrates one possible scenario for use of dynamic joins. Embodiments described herein, however, might be used to join any views at run time. When the final join conditions cannot be predefined (but rather are available only at run time), dynamically joined fast search views may provide the required flexibility.

The dynamically joined fast search view 310 may be constructed at runtime might not be manifested in the persisted fast search metadata (but instead might encompass a set of metadata passed at runtime to a dynamic join API). A dynamically created logical index on the search engine may then be used for selection and data retrieval (in much the same way as a statically modeled fast search view).

According to some embodiments, the basis for a dynamically joined fast search view is a pre-defined "anchor" view. The anchor view may be, for example, a complex structure including many business object nodes joined together by statically defined join conditions or could consist of only a single business object node.

If no other joined views are declared in the execution API, the view execution call may be passed directly to the normal view execution routine of the anchor node. This may let an application programmer use the dynamically joined view execution API even if the individual runtime scenario does not require any other joined views (e.g., and the system falls back to regular view execution).

Note that a number of views can be declared that are dynamically joined to the anchor view via a given join condition. Similarly, the join condition may also be declared at runtime. According to some embodiments, an "alias" may be given to each joined view to help ensure that all fields can be uniquely identified. That is, the alias may uniquely identify each view in the execution. Note that the anchor view might be used without an alias (to help ensure that a fallback to regular view execution is possible).

The virtual view that results from the dynamic join can encompass a large number of fields. Potentially, all fields from all views of the dynamic join may be accessible in both the selection condition and the list of requested fields. Since the large number of fields can cause performance and other technical problems, it is possible to limit the number of fields used in the dynamically joined view by passing a list of fields that are to be used. This list might include the view alias and regular field name of the attribute in the regular fast search view.

Internally, the combination of the view alias and field name may be mapped to an alias which then forms a technical name for the field in the virtual view. Moreover, the fields may be internally addressed by this alias. The result fields may be passed to the calling application with this alias along with a field mapping table. The application may then re-map the fields according to the mapping table.

When views are combined via join conditions, the join paths of all fields in the respective views may be recalculated. The anchor node of the anchor view may be the basis for the new join path, and all paths may be calculated with respect to this node. For the fields in the anchor node, the join path may remain unchanged. For the other nodes, the join paths of all fields may represent the path from the anchor node of the anchor view to the node from which the respective view is joined (plus the join condition with respect to the anchor view and the join path in the fields original view).

According to some embodiments, the runtime call to the dynamically joined view execution API consists of two calls. First, an "initialization" call may be used to define the virtual view and declare the fields that are used. This call may trigger the creation of the logical index on the search engine. It may also return to the call a data structure that can be used to hold the result data. This structure may, for example, be passed as a data reference that is then included in the call to the actual dynamic join execution along with the other parameters associated with the execution (e.g., selection conditions, sorting criteria, and constraints)

During the initialization routine, the structure container (data reference) may be created using the provided fields. As the fields may be part of a fast search view (either the anchor view or one of the joined views), the metadata for the fields may already be available in a fast search shared memory meta data repository. This metadata may include the type information needed to build the result structure container. During initialization, this type of metadata may be combined to form a new data reference structure that is then used during execution.

The virtual view creation may then include: (1) collecting the required view fields, (2) calculating the individual join paths, and (3) creating the logical index on the search engine. The fast search feature of on-demand logical index creation may be used to efficiently create the logical index, and a caching mechanism ensures that previously created logical indices can be reused.

During the virtual view execution, the view execution parameters may be mapped to the internal alias of the virtual view. This may include the selection condition, the sorting criteria and other criteria. The view execution may then be handled in the same way as a regular fast search view execution.

Figure 4:
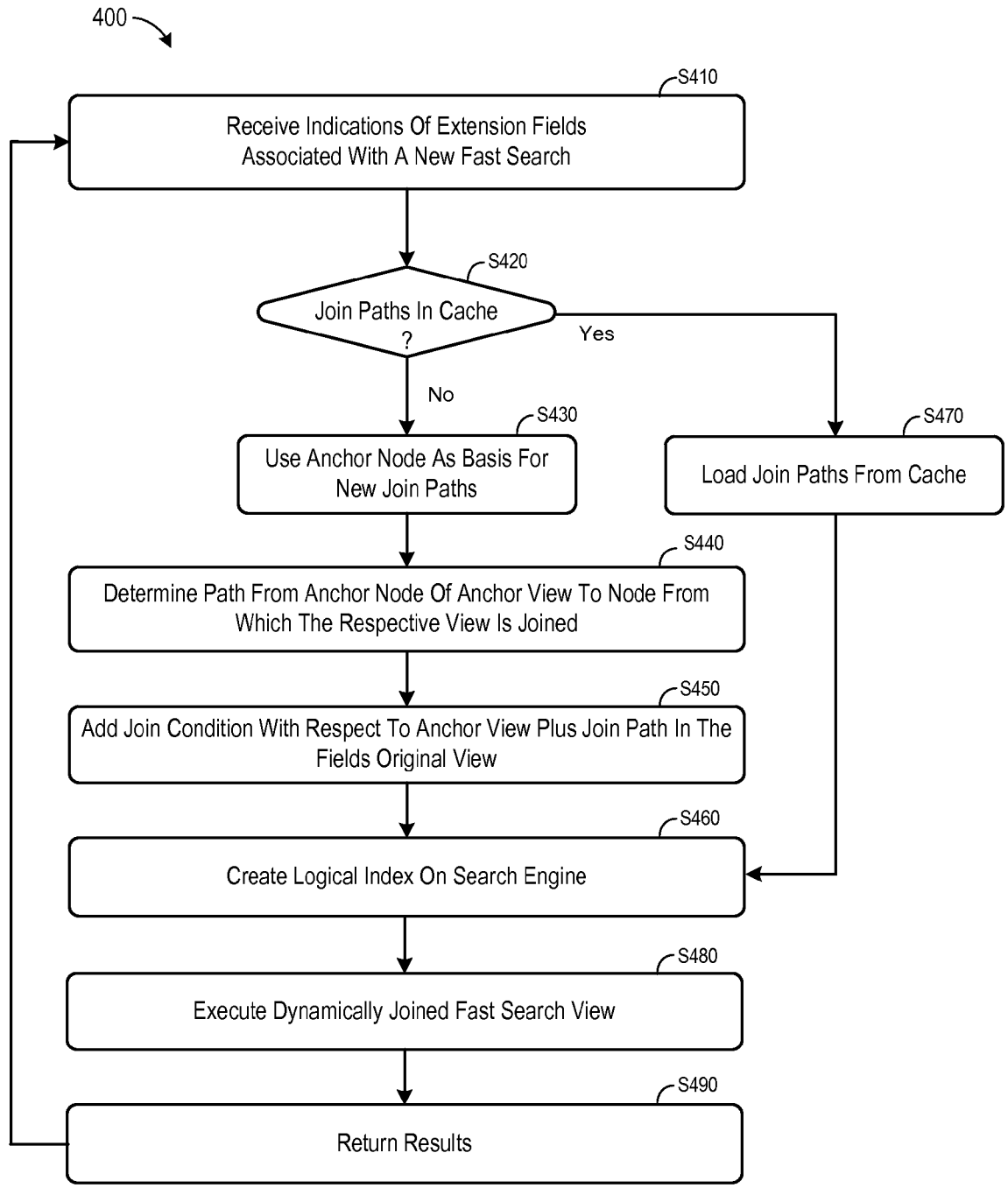
FIG. 4 is a flow diagram of a process according to some embodiments.

Once a dynamic join is created, the virtual view execution might be called repeatedly by a client (e.g., to generate reports for each of a large number of employees). For example, a client may want to extend a reporting scenario by a single field of his or her choice. If this new field requires the addition of another fast search view to the regular reporting view, the result of this extension would be to use a dynamically joined view execution. Once defined, the client may use this dynamically joined view in regular reporting. The first execution call then creates the respective logical index. This index might not be immediately destroyed, according to some embodiments, but may instead be stored in caching routine. If the dynamic view execution API receives another call for the same combination of joined views, this cached logical index can be re-used. An invalidation mechanism may ensure that the number of logical indices created remains manageable. Note that the cache might be implemented in any of a number of different ways. For example, FIG. 4 is a flow diagram of a process 400 according to some embodiments. At S410, indications of extension fields associated with a new fast search are received (e.g., a user might add several fields to an existing anchor view). These additional extension fields may require that additional views be joined to the anchor view. It is then determined whether or not the required new join paths have already been calculated and stored in a cache at S420.

If the join paths do not exist in the cache at S420, the anchor node is used as the basis for the new join paths at S430 and the appropriate paths are determined from the anchor node of the anchor view to the nodes from which the respective views are being joined at S440. The appropriate join conditions are added with respect to the anchor view at S460 along with the join path in the fields original view. The logical index may then be created on the search engine at S470.

Note that if the join paths did already exist in the cache at S420, the method 400 may load them from the cache at S480 and immediately create the logical index at S470. After the logical index is created on the search engine, the dynamically joined fast search view may be executed at S480 and the appropriate results may be returned at S490.

Figure 5:
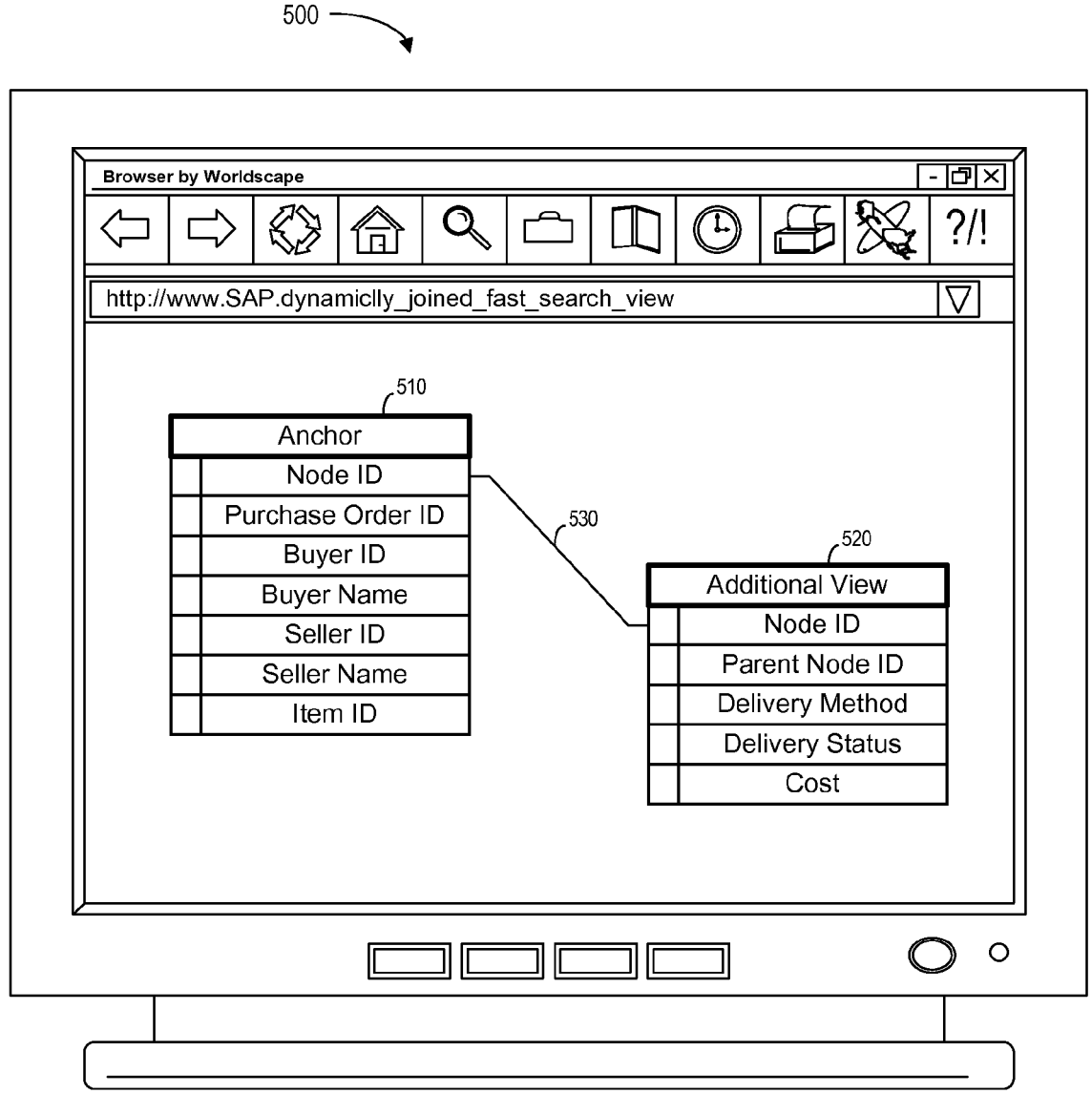
FIG. 5 illustrates a graphical user interface in accordance with some embodiments.

Note that one or more User Interfaces (UI) may be used by a client to add extension fields to a search and/or to receive search results. For example, FIG. 5 displays an exemplary Graphical UI (GUI) 500 that may be used by, for example, a client to make changes to predefined anchor views. According to some embodiments, a UI might include view builder UI with a join builder tool (e.g., to let a user to load node descriptions and define join conditions between nodes), a view field definition tool, and/or a data source tool. It should be appreciated that the arrangement of the various components of UIs described herein may be changed, modified, enhanced, pared down, or otherwise altered to differ from the particular layout and configuration depicted in FIG. 5. In some embodiments, the particular layout and configuration of UI 500 may be altered while aspects of the functionality are preserved to facilitate the designing and creation of the views as disclosed herein.

According to some embodiments, each of the data structures that are selected for inclusion in the view being created may be displayed in a separate or distinct graphical representation such as boxes 510 and 520. Each graphical representation of the selected nodes, i.e., a box or other graphical representation, icon, or visual designator, could contain the name of the node and a list of attributes of the selected node included in the view, as well as descriptions of the attributes.

According to some embodiments, the UI 500 permits a user to define and specify join conditions using a number of user interface manipulation methods and processes. For example, a join condition between nodes may be defined by a user drawing a line 530 between the nodes, a "drag and drop" operation, and other GUI processes, including keyboard and input device entries to link the nodes together by a join. In some embodiments, the UI 500 facilitates the specification of the available or permissible types of joins (e.g., left outer joins and inner joins in some embodiments). Moreover, the user may be able to include additional data in a pre-defined anchor report via the US 500 (e.g., he or she might right click a computer mouse button when the mouse pointer is over a particular portions of the display and select "Add New Data Field to Search" from a drop down menu).

Figure 6:
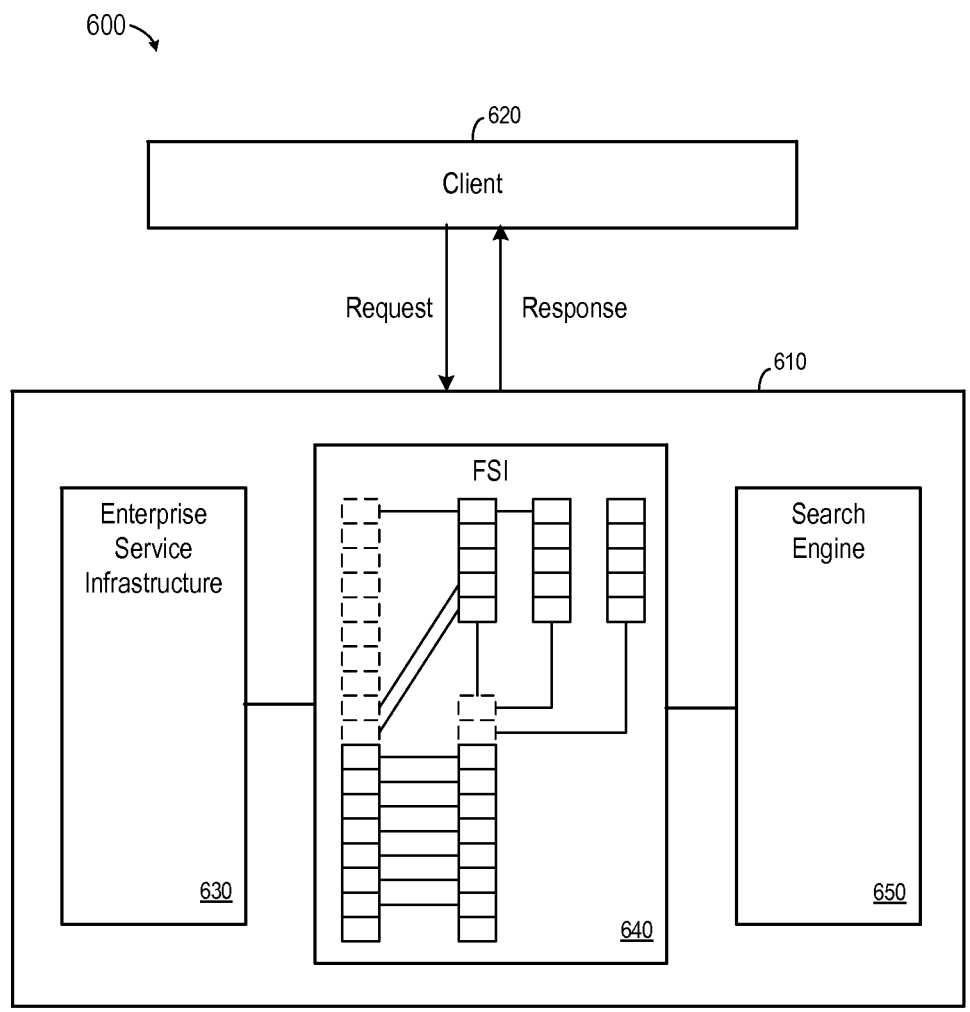
FIG. 6 is a flow diagram of a method according to some embodiments.

The UI 500 and other devices described herein may be implemented using various different types of hardware platforms and, in some cases, an enterprise may access business information using a service-oriented architecture. For example, FIG. 6 is a block diagram of a system 600 wherein a business process platform 610 (e.g., associated with an ERP provider) may receive a request from a client device 620. The request might comprise, for example, a request to view a business object related to a purchase order. The use of the remotely hosted business process platform 610 may help the enterprise avoid the costs and problems associated with maintaining a local, "in house" ERP system.

The client device 620 may comprise a Web browser to access services provided by business process platform 610 via HyperText Transport Protocol (HTTP) communication. For example, a user may manipulate a user interface of the client device 620 to input an instruction (e.g., "add new element to anchor view"). The client device 620, in response, may transmit a corresponding HTTP service request to the business process platform 610 as illustrated. A service-oriented architecture may conduct any processing required by the request (e.g., dynamically joining fast search views) and, after completing the processing, provides a response to client device 620.

The business process platform 610 may comprise a service-oriented architecture such as those provided by SAP Business ByDesign® or Salesforce. The business process platform 610 may further include an enterprise service infrastructure 630, a fast search infrastructure 640, and a search engine 650 in accordance with any of the embodiments described herein. The client device 620 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a dedicated standalone application.

Note that FIG. 6 represents a logical architecture for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer implemented method, comprising:
    defining an anchor transactional view for at least one business object data structure, the anchor transactional view being a standard pre-defined search view of stored data within physical tables of a database, the anchor transactional view having a plurality of anchor fields, each anchor field representing a data source, each anchor field being associated with a field of an anchor search view representing underlying business object nodes of a data source connected by database join functions;
    receiving a search request from a client, the search request including an indication of including an additional at least one extension field to the anchor search view, the anchor search view and at least one extension field representing a virtual fast search infrastructure view of the stored data within the physical tables of the database; and
    responsive to the received indication of the at least one extension field, adding an additional view of a data structure to the anchor transaction view by dynamically executing a database join at runtime, the additional view having at least one additional field, wherein each additional field is associated with one of the extension fields.

2. The method of claim 1, wherein the additional view comprises a master data view.

3. The method of claim 1, wherein a plurality of master data views are dynamically joined at runtime to the anchor transactional view.

4. The method of claim 1, further comprising:
    passing a list of views and respective join conditions to a view execution interface at runtime.

5. The method of claim 1, further comprising:
    directly calculating join paths for all of the extension fields at run time.

6. The method of claim 5, further comprising:
    determining via a caching mechanism whether or not the join paths have already been calculated and stored into a buffer such that multiple calls to the same dynamically joined view will not result in re-calculation of join paths.

7. The method of claim 1, further comprising:
    dynamically creating an in-memory logical index on a search engine at runtime in response to an initialization call;
    creating a result data structure; and
    passing the result data structure as a data reference.

8. The method of claim 7, further comprising:
    including the result data structure in a call to a dynamic join execution, wherein the call further includes at least one of: (i) a selection condition, (ii) sorting criteria, or (iii) constrain parameters.

9. The method of claim 8, further comprising:
    generating a report based at least in part on information in the result data structure.

10. The method of claim 1, further comprising:
    for each of the extension fields, dynamically defining, at run time, an alias to reference the extension field.

11. A non-transitory computer-readable medium storing program code executable by a computer to:
    define an anchor transactional view for at least one business object data structure, the anchor transactional view being a standard pre-defined search view of stored data within physical tables of a database, the anchor transactional view having a plurality of anchor fields, each anchor field representing a data source, each anchor field being associated with a field of an anchor search view representing underlying business object nodes of a data source connected by database join functions;
    receive a search request from a client, the search request including an indication of including an additional at least one extension field to the anchor search view, the anchor search view and at least one extension field representing a virtual fast search infrastructure view of the stored data within the physical tables of the database; and
    responsive to the received indication of the at least one extension field, adding an additional view of a data structure to the anchor transaction view by dynamically executing a database join at runtime, the additional view having at least one additional field, wherein each additional field is associated with one of the extension fields.

12. The medium of claim 11, wherein the additional view comprises a master data view.

13. The medium of claim 11, wherein a plurality of master data views are dynamically joined at runtime to the anchor transactional view.

14. The medium of claim 11, further comprising:
    passing a list of views and respective join conditions to a view execution interface at runtime.

15. A system associated with an anchor transactional view for at least one business object data structure, the anchor transactional view being a standard pre-defined search view of stored data within physical tables of a database, the anchor transactional view having a plurality of anchor fields, each anchor field representing a data source, each anchor field being associated with a field of an anchor search view representing underlying business object nodes of a data source connected by database join functions, comprising:
    an enterprise service infrastructure;
    a fast search infrastructure in communication with the enterprise service infrastructure, wherein the fast search infrastructure is configured to:
        receive a search request from a client, the search request including an indication of including an additional at least one extension field to the anchor search view, the anchor search view and at least one extension field representing a virtual fast search infrastructure view, and
        dynamically execute a database join at runtime to add an additional view of a data structure to the anchor transactional view, the additional view having at least one additional field, wherein each additional field is associated with one of the extension fields; and
    a search engine in communication with the fast search infrastructure and configured to execute a search in accordance with the dynamically joined views and to output a search result of the stored data within the physical tables of the database.

16. The system of claim 15, wherein the additional view comprises a master data view.

17. The system of claim 16, wherein a plurality of master data views are dynamically joined at runtime to the anchor transactional view.

18. The system of claim 15, wherein join paths for all of the extension fields are dynamically calculated at run time.

19. The system of claim 18, further comprising:
a caching mechanism to determine whether or not the join paths have already been calculated and stored into a buffer such that multiple calls to the same dynamically joined view will not result in re-calculation of join paths.

20. The system of claim 15, wherein an in-memory logical index is dynamically created on said search engine at runtime in response to an initialization call.

21. The system of claim 15, wherein an alias is dynamically defined for each of the extension fields at run time to reference the extension field.

* * * * *